United States Patent [19]

Zemke

[11] Patent Number: 4,670,743
[45] Date of Patent: Jun. 2, 1987

[54] KEYBOARD CURSOR CONTROLLER

[75] Inventor: Steven C. Zemke, Post Falls, Id.

[73] Assignee: General Instrument Corporation, New York, N.Y.

[21] Appl. No.: 697,016

[22] Filed: Jan. 31, 1985

[51] Int. Cl.⁴ .............................................. G09G 1/00
[52] U.S. Cl. .................................... 340/709; 340/706; 340/365 P; 178/18; 74/471 XY
[58] Field of Search .............. 340/709, 712, 706, 710, 340/810; 178/18; 250/215, 237 R, 237 G; 74/471 XY

[56] References Cited

U.S. PATENT DOCUMENTS

| | | | |
|---|---|---|---|
| 1,901,673 | 3/1933 | Sleeper | 178/18 |
| 3,266,523 | 8/1966 | Stevens | 74/471 XY |
| 3,541,521 | 11/1970 | Koster | 340/172.5 |
| 3,541,541 | 11/1970 | Engelbart | 340/324 |
| 3,665,102 | 5/1972 | Townsend et al. | 178/18 |
| 3,668,685 | 6/1972 | Horvath | 340/324 |
| 3,786,689 | 1/1974 | Houk | 74/471 |
| 4,161,726 | 7/1979 | Burson et al. | 340/365 |
| 4,459,578 | 7/1984 | Sava et al. | 338/128 |
| 4,464,652 | 8/1984 | Lapson et al. | 340/710 |
| 4,521,773 | 6/1985 | Lyon | 340/710 |
| 4,529,964 | 7/1985 | Minami et al. | 250/237 G |
| 4,550,221 | 10/1985 | Mabusth | 340/706 |
| 4,575,581 | 3/1986 | Langberg | 178/18 |

OTHER PUBLICATIONS

Optoelectronic Designer's Catalog 1983, Hewlett Packard Components, 640 Page Mill Road, Palo Alto, CA 94304, p. 195.

Primary Examiner—Gerald L. Brigance
Assistant Examiner—Ruffin B. Cordell
Attorney, Agent, or Firm—Barry R. Lipsitz

[57] ABSTRACT

A cursor controller has a handle having first and second perpendicular slots disposed in different parallel planes. A first cross-slide is slidably mounted in the first slot and guides the motion of the handle along an x axis. A second cross-slide is slidably mounted in the second slot and guides the motion of the handle along a y axis. A first encoder strip mounted to the first cross-slide is provided together with a quadrature detector for sensing the direction and magnitude of movement of the handle along the y axis. A second encoder strip mounted to the second cross-slide is provided together with a quadrature detector for sensing the direction and magnitude of movement of the handle along the x axis. Signals from the quadrature detectors are processed and coupled to a computer to provide cursor control on the computer's display screen. An end of travel reset feature restricts movement of the cursor when the handle reaches the end of its travel along an axis, until the handle is withdrawn and once again moved toward the same end of travel position.

10 Claims, 12 Drawing Figures

KEYBOARD CURSOR CONTROLLER

BACKGROUND OF THE INVENTION

The present invention relates to computer input devices, and more particularly to a keyboard mounted cursor controller for use in moving a cursor on a video display screen.

Various types of cursor controllers are known in the art, including joysticks and mouse devices. A joystick is a control having a lever which can be pivoted to cover an area defined along x-y coordinates. The motion of a joystick is the same as that obtained from a ball joint. Joystick controllers have been used extensively in video games. Examples of joystick controllers are shown in U.S. Pat. Nos. 3,786,689, 4,161,726, and 4,459,578.

A mouse is a form of cursor controller which is held in the user's hand and pushed along a tabletop. The movement of the mouse with respect to the tabletop is parrotted by the cursor on the video display terminal. An example of a mouse controller is shown in U.S. Pat. No. 4,464,652.

Joystick controls are generally bulky and are therefore not easy to build into a low profile computer keyboard. Further, even if a joystick were built into a keyboard, the resulting product would probably not be aesthetically appealing. Thus, such controls are usually found as separate components apart from the computer keyboard.

Similarly, mouse devices are separate from the keyboard of the computer with which they are used, and are often complex and costly.

It would be advantageous to provide a cursor controller that is built into a computer keyboard. Such a controller must be dimensionally able to fit within the keyboard while providing precise and reliable operation. Further, it would be advantageous for such a controller to be economical and lend itself to mass production assembly.

The present invention relates to such a keyboard cursor controller.

SUMMARY OF THE INVENTION

In accordance with the present invention, a cursor controller is provided for use with a computer. The controller includes actuator means that can comprise, for example, a handle having first and second perpendicular slots disposed in different parallel planes thereof. First cross-slide means are slidably mounted in the first slot for guiding the motion of the handle along an x axis of finite length. Second cross-slide means are slidably mounted in the second slot of the handle for guiding the motion of the handle along a y axis of finite length. A first encoder strip is mounted to the first cross-slide means. First detector means are provided for sensing the direction and magnitude of movement of the first encoder strip along the y axis. A second encoder strip is mounted to the second cross-slide means. Second detector means are provided for sensing the direction and magnitude of movement of the second encoder strip along the x axis.

The encoder strips of the cursor controller can comprise a plurality of uniformly spaced stripes. The first and second detector means can comprise two opto-couplers offset from each other along the length of their respective encoder strip by a distance equal to one-fourth the space between adjacent stripes. In this manner, the direction of movement of the encoder strips can be determined by standard quadrature techniques.

The cursor controller of the present invention can include means for detecting the end of travel of the actuator means (i.e., handle) within the limited area of the controller (e.g., at either end of the x and y axes). Further, means are provided for inhibiting movement of a cursor on a video display, in a direction opposite to the cursor's last movement along an axis, when the end of travel of the handle is detected along that axis. In such a situation, cursor motion remains restricted until the handle is withdrawn from the end of travel position and once again moved in the direction corresponding to the last cursor movement. The end of travel can be detected by placing a specially formatted end of travel indicia at the ends of each encoder strip. Such indicia could, for example, comprise a pair of transverse stripes placed closer to each other than the other uniformly spaced stripes on the encoder strip. Alternate means for detecting end of travel, such as keeping an accurate count of the stripes on the encoder strip, are also possible.

DETAILED DESCRIPTION OF THE INVENTION

Figure 1:
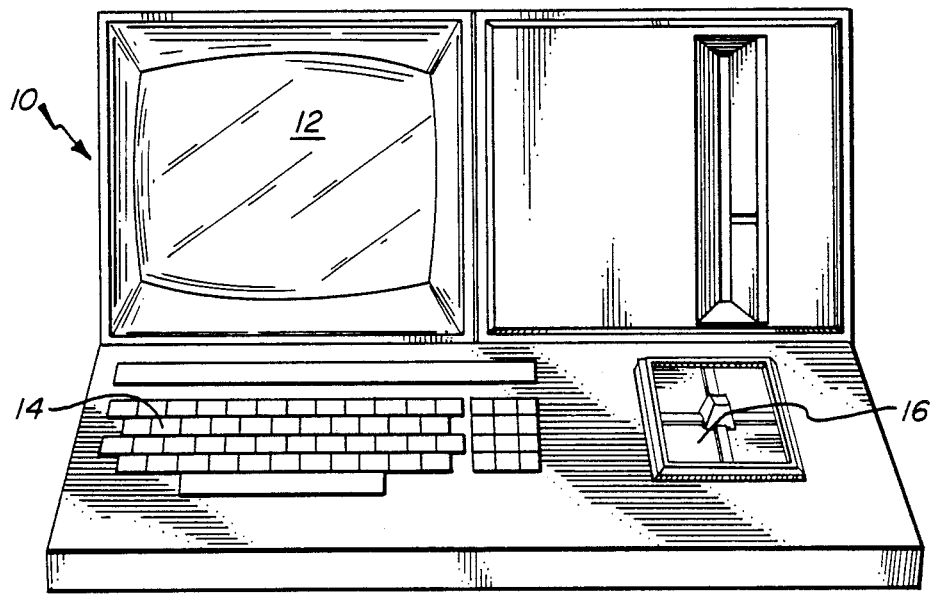
FIG. 1 is a view of a computer terminal containing a cursor controller in accordance with the present invention.

This invention concerns a keyboard cursor controller for enabling a computer user to move a cursor displayed on the screen of a video display terminal. A computer terminal 10 as shown in FIG. 1 includes a video display screen 12 and keyboard 14. In accordance with the present invention, a cursor controller 16 is mounted alongside keyboard 14 to enable the computer user to move a cursor displayed on screen 12.

Figure 2:
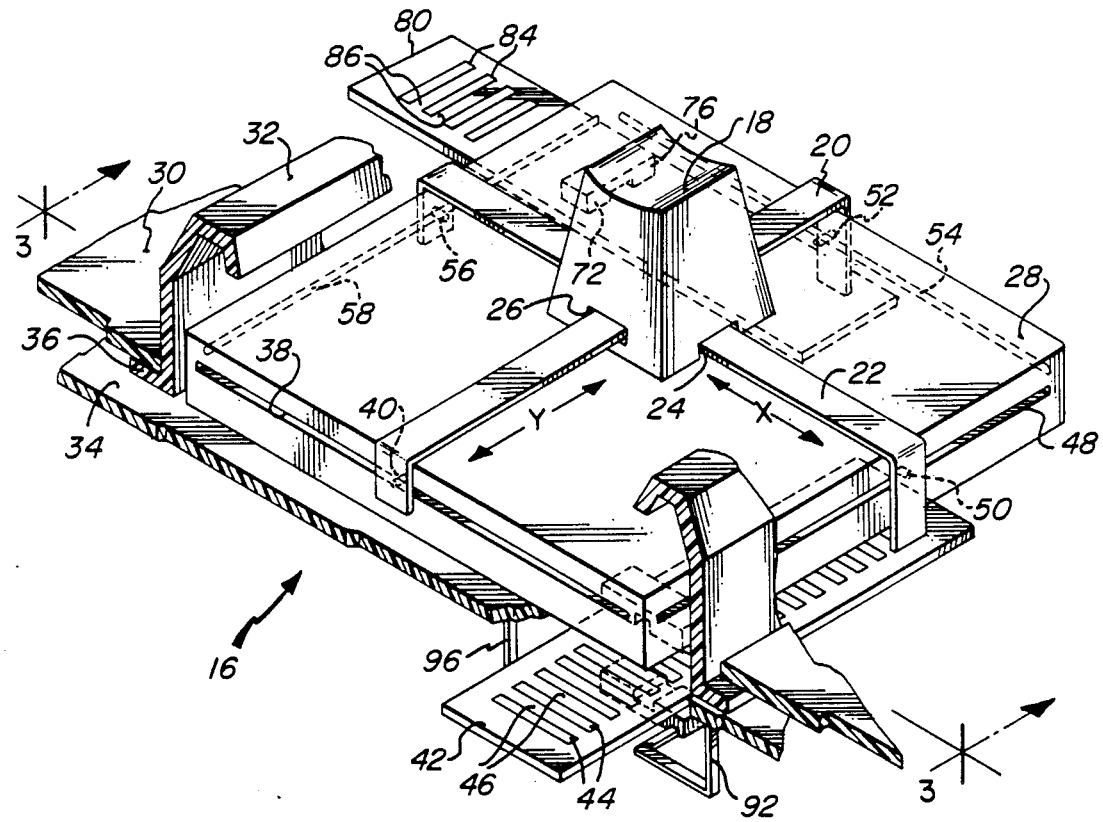
FIG. 2 is a perspective detail view of the cursor controller of the present invention.

Turning to FIG. 2, the cursor controller includes a handle 18 having first and second perpendicular slots 24 and 26 disposed in different parallel planes. A first cross-slide 22 is slidably mounted in first slot 24 for guiding the motion of handle 18 along an x axis. A second cross slide 20 is slidably mounted in second slot 26 for guiding the motion of handle 18 along a y axis.

The opposite ends of first cross slide 22 are bent 90° to conform with opposed edges of guide block 28. A pin 50 extending from the bent end of first cross-slide 22 extends into a track 48 at one end of guide block 28. At the opposed end of guide block 28, a pin 56 extends from the bent end of first cross-slide 22 and engages a track 58 in guide block 28. Tracks 48 and 58 together with pins 50 and 56 retain first cross-slide 22 above block 28 and guide cross-slide 22 as it moves back and forth along the y axis shown in FIG. 2. Similarly, pins 40 and 52 together with tracks 38 and 54 in guide block 28 retain and guide second cross-slide 20 as it moves along the x axis shown in FIG. 2. In this manner, guide block 28 establishes a predefined limited area within which handle 18 can be moved.

A first encoder strip 42 is mounted to first cross-slide 22. Strip 42 is encoded with a plurality of transverse spaced stripes 44 separated by uniformly spaced portions 46. Encoder strip 42 can be fabricated, for example, from sheet metal having uniformly spaced slots 44 and ribs 46 punched therein.

A second encoder strip 80 is mounted to second cross-slide 20. Encoder strip 80 includes a plurality of transverse stripes 84 separated by uniform spaces 86, and is identical to first encoder strip 42.

A housing 32 partially encloses the cursor controller 16. Mounting lip 36 of housing 32 is sandwiched between a keyboard printed circuit board 34 and keyboard frame 30. Guide block 28 is glued or otherwise mounted to printed circuit board 34.

Figure 3:
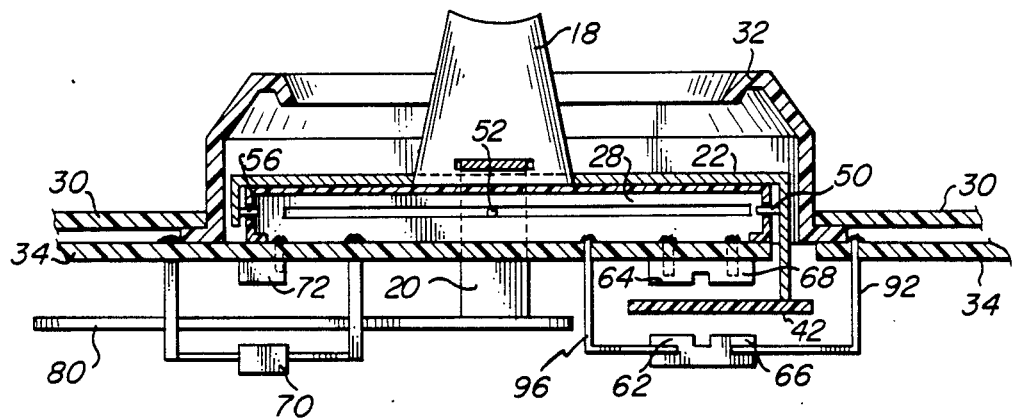
FIG. 3 is cross-sectional view taken along the lines 3—3 of FIG. 2.
Figure 4:
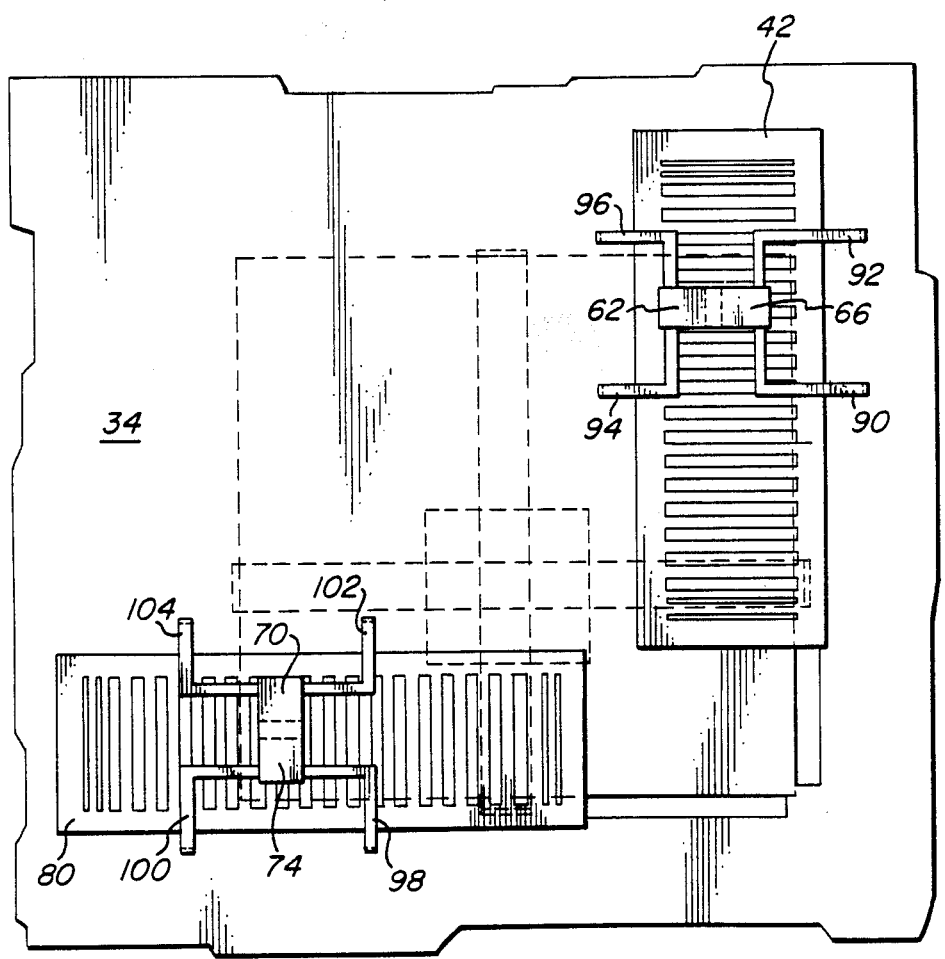
FIG. 4 is a bottom plan view of the cursor controller shown in FIGS. 2 and 3.

A pair of opto-couplers or equivalent detectors is associated with each of the first and second encoder strips 42, 80. As best shown in FIGS. 3 and 4, a pair of optical emitters 62, 66 is mounted on one side of first encoder strip 42. A pair of optical detectors 64, 68 is mounted on the opposite side of first encoder strip 42. Emitters 62, 66 are mounted by soldering leads 90, 92, 94, and 96 to keyboard circuit board 34. Detectors 64, 68 are also mounted by soldering leads extending therefrom to circuit board 34 in a conventional manner.

An optical emitter pair 70, 74 is mounted on one side of second encoded strip 80 by soldering leads 98, 100, 102, 104 to keyboard circuit board 34. A corresponding pair of optical detectors 72, 76 is mounted directly to circuit board 34 on the other side of second encoder strip 80.

In operation, handle 18 can be moved anywhere within the perimeter of guide block 28. As handle 18 is moved along first cross-slide means 22, it carries second cross-slide means 20 with it in the x direction. Similarly, as handle 18 is moved along second cross-slide means 20 in the y direction, first cross-slide means 22 moves in the y direction. When first cross-slide 22 is moved in the y direction by handle 18, first encoder strip 42 also moves in the y direction. The magnitude and direction of movement of strip 42 is detected through the use of optical emitters 62, 66 and detectors 64, 68.

Figure 11:
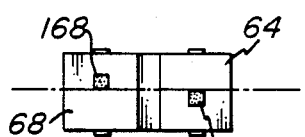
FIG. 11 is a plan view of a pair of detectors used to sense the magnitude and direction of movement of an encoder strip.

As noted above, encoder strip 42 includes a plurality of transverse, uniformly spaced stripes 44. The optical detectors 64, 68 associated with strip 42 contain detector elements 164, 168, as shown in FIG. 11, which are offset from each other by one-fourth the space between adjacent stripes 44 on encoder strip 42. In this manner, the direction of movement of strip 42 along the y axis can be determined by standard quadrature phase detection techniques. Such techniques are well known to those skilled in the art. A good explanation of directional information sensing using quadrature is provided in the publication entitled "Optoelectronic Designer's Catalog 1983", Hewlett-Packard, Palo Alto, Calif., page 195, which is incorporated herein by reference.

Detectors 72, 76 associated with second encoder strip 80 are identical to detectors 64, 68 and include detector elements which are offset by a distance equal to one-fourth the space between adjacent stripes 84. Thus, the direction and magnitude of movement of handle 18 in the x direction is detected through the use of second encoder strip 80 together with optical emitters 70, 74 and detectors 72, 76. Similarly, the direction and magnitude of movement of handle 18 in the y direction is detected through the use of first encoder strip 42 together with optical emitters 62, 66 and detectors 64, 68.

Figure 12:
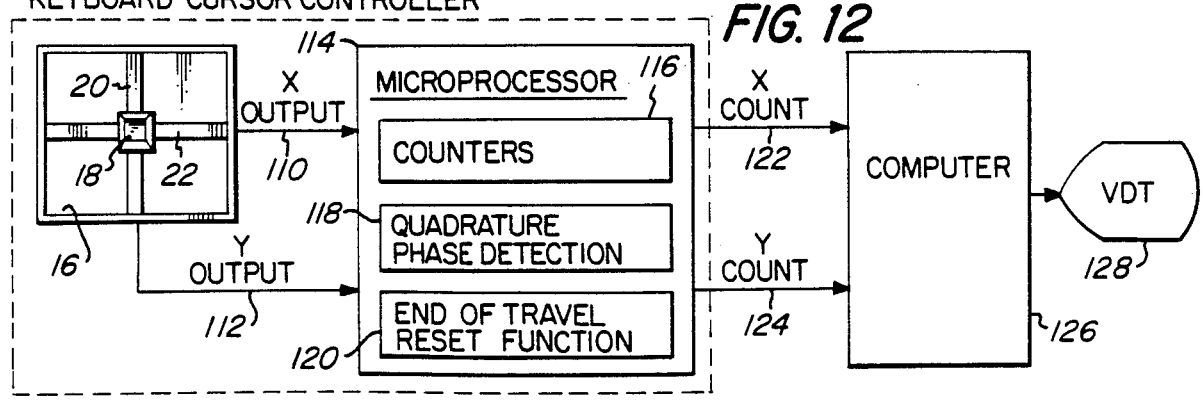
FIG. 12 is a block diagram of the keyboard cursor controller interfaced to a computer.

A block diagram showing the structure of the keyboard cursor controller and its interface to a computer is shown in FIG. 12. The outputs from detectors 72, 76 are coupled to a microprocessor 114 via x output line 110. The outputs of optical detectors 64, 68 are coupled to microprocessor 114 via y output line 112. Microprocessor 114 includes counters 116, quadrature phase detection subsystem 118, and an end of travel reset function 120 to be described below. After processing the x output and y output data from the optical detectors, microprocessor 114 produces x-axis count data and y-axis count data representative of movement of handle 18 along the x and y axes, respectively. The x count data is interfaced to a computer 126 on line 122. The y count data is interfaced to computer 126 on line 124. Computer 126 receives the x count and y count data in a standard format from microprocessor 114 and uses this data to control the movement of a cursor on video display terminal 128. The data sent to computer 126 from the microprocessor 114 of the keyboard cursor controller can be in the same format that data has been transmitted from mouse devices in the prior art. In such case, no special modification of computer 126 is necessary in order to use the keyboard cursor controller of the present invention.

The keyboard cursor controller of the present invention also provides an end of travel reset function, the operation of which is illustrated in FIGS. 5 through 8. When handle 18 is pushed to the end of travel in any direction, such condition is sensed and cursor control in the reverse direction is temporarily inhibited. This allows handle 18 to be brought back into a position where it can continue to move the cursor in the direction in which end of travel was reached. This is diagrammatically illustrated in FIGS. 5 through 8.

Figure 5:
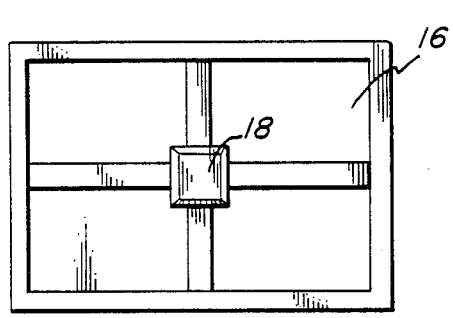
FIGS. 5, 6, 7, and 8 illustrate the movement of a cursor in response to movement of the cursor controller of the present invention.
Figure 5:
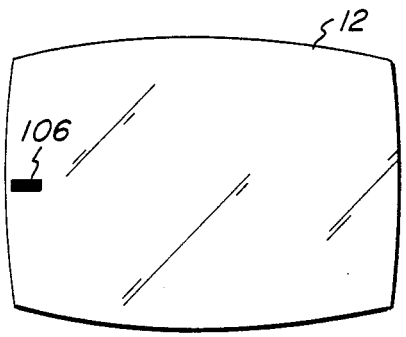
Figure 6:
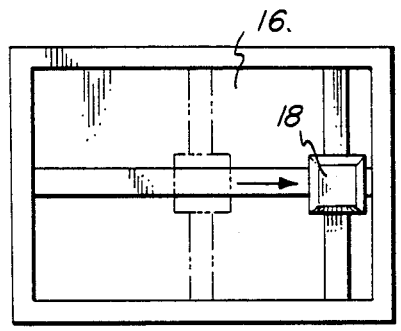
Figure 6:
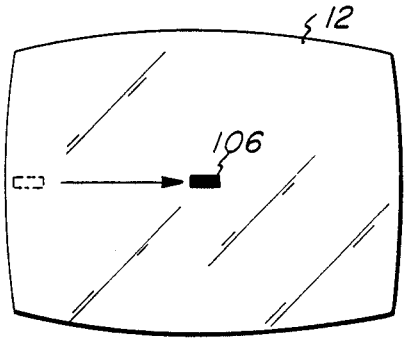
Figure 7:
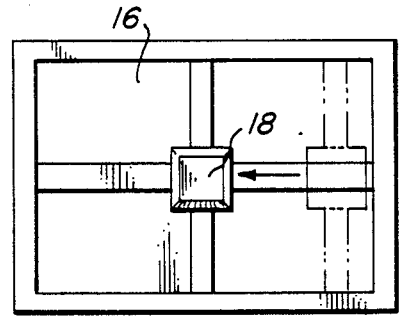
Figure 7:
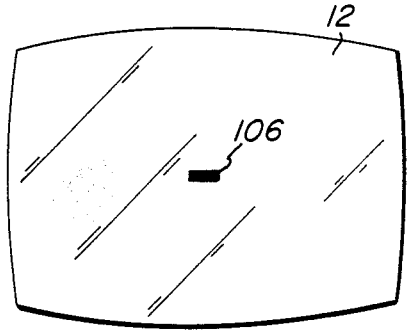
Figure 8:
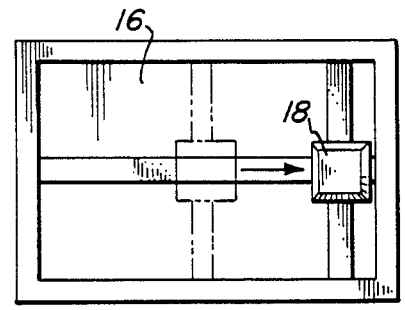
Figure 8:
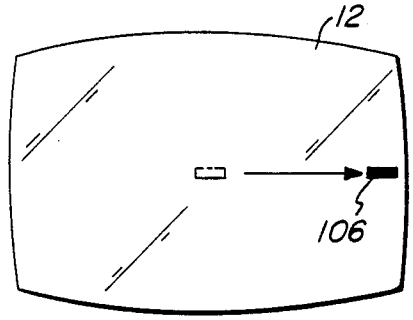

As shown in FIG. 5, if handle 18 is centered and cursor 106 is at the left margin of video display screen 12, movement of handle 18 toward the right, as shown in FIG. 6, will cause cursor 106 to move toward the center of screen 12. Once handle 18 is at the end of its travel in the x direction, as shown in FIG. 6, it would be impossible to move cursor 106 all the way over to the rightmost margin of screen 12 if movement of handle 18 toward the left would drag the cursor back to the left side of screen 12. Thus, as shown in FIG. 7, a mechanism is necessary to inhibit movement of cursor 106 toward the left when handle 18 is moved leftward from its rightmost end of travel position. By inhibiting movement of cursor 106, handle 18 can be moved back toward the center of the cursor controller, as shown in FIG. 7, and then moved to the right again, as shown in FIG. 8, to cause cursor 106 to continue to the rightmost edge of screen 12.

Figure 9:
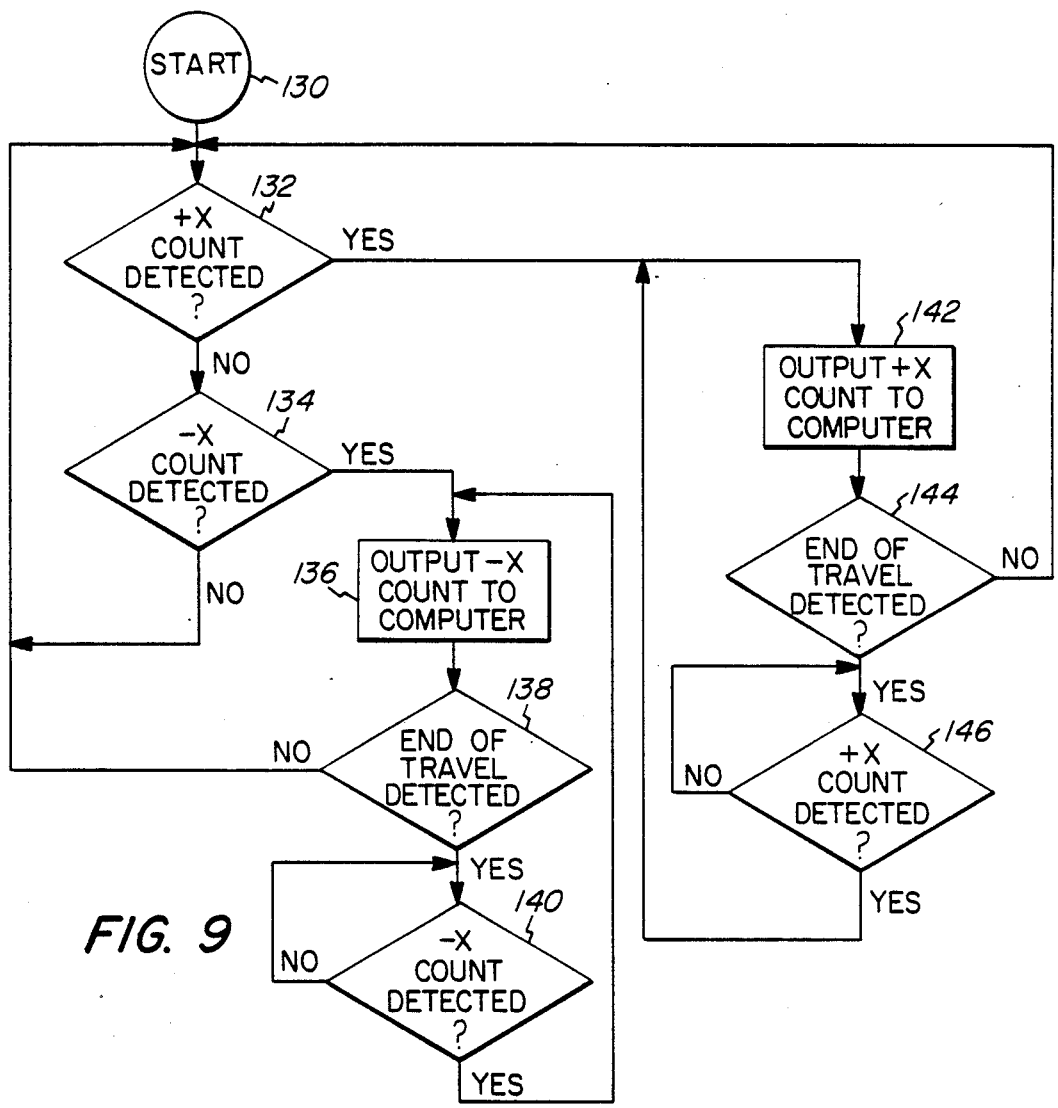
FIG. 9 is a flow chart illustrating a routine which can be used to inhibit backward movement of a cursor when the cursor controller has been moved to its end of travel.

A software routine for implementing the end of travel reset function in the x direction is shown in the flow chart of FIG. 9. After entering the routine at box 130, control passes to box 132 where a determination is made as to whether the handle has moved in the +x direction. The +x direction, for purposes of this example, is movement of handle 18 in the x direction toward the right as shown in FIG. 2. If no such movement of handle 18 is detected by optical detectors 72, 76, control passes to box 134 and a determination is made as to whether movement of handle 18 has been made in the −x direction. For purposes of this example, the −x direction is defined as leftward movement of handle 18 along the x axis as shown in FIG. 2. If no such movement is detected, control passes back to box 132 and the loop continues until some motion in the x direction is detected.

Figure 10:
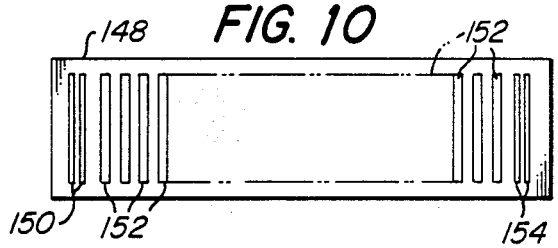
FIG. 10 is a plan view of an encoder strip for use with the keyboard cursor controller of the present invention.

When handle 18 is moved in the +x direction, control passes from box 132 to box 142 and a +x count is output to computer 126. Then, at box 144, a determination is made as to whether handle 18 is at its end of travel position. Such determination can be made by detectors 72, 76 through the use of a specially formatted end of travel indicia at the end of the encoder strip being read by detectors 72, 76. An example of a specially formatted end of travel indicia is shown on encoder strip 148 in FIG. 10, which can be substituted for strip 42 in FIG. 2. At one end of strip 148, two very closely spaced stripes 150 are present. At the other end of strip 148, two closely spaced stripes 154 are present. Specially formatted indicia 150 and 154 are detected by the optical detectors used with strip 148 and indicate that encoder strip 148, and hence handle 18, is at an end of travel position. The remaining stripes 152 on encoder strip 148 are uniformly spaced and used to sense the direction and magnitude of movement of strip 148 through quadrature techniques as described above. Those skilled in the art will appreciate that other means can be provided for detecting the end of travel of handle 18.

If end of travel is detected at box 144 in FIG. 9, control passes to box 146 where the routine waits for the next count which is detected in the +x direction. Once a +x count is detected, the count is output to computer 126 at box 142. Control then passes to box 144, and if an end of travel condition is not detected, control passes back to box 132 for repetition of the routine.

Boxes 136, 138, and 140 perform the same functions in the −x direction that boxes 142, 144, and 146 provide in the +x direction of handle travel.

An identical routine would be used for detecting an end of travel condition along the y axis of the cursor controller. In this manner, a cursor appearing on a video display terminal can be moved to any point on the display screen using the controller of the present invention.

The end of travel routine can also be used with other types of cursor controllers, such as mouse and joystick devices. This is particularly advantageous, in that it allows such devices to be manufactured in reduced size for mounting on a keyboard, and yet still provide control of cursor movement over the full area of an associated computer display.

What is claimed is:

1. A cursor controller for use with a computer comprising:
    a handle having first and second perpendicular slots disposed in different parallel planes;
    first cross-slide means slidably mounted in said first slot for guiding the motion of said handle along an x axis of finite length;
    second cross-slide means slidably mounted in said second slot for guiding the motion of said handle along a y axis of finite length;
    first movable encoder strip and fixed detector means for sensing motion of said handle along said y axis;
    second movable encoder strip and fixed detector means for sensing motion of said handle along said x axis; and
    means for electrically coupling said first and second detector means to a computer to control the movement of a computer generated cursor in response to movement of said handle, said electrical coupling means further including:
        means for determining the magnitude and direction of handle movement along said x and y axes;
        means for detecting the end of travel of said handle at either end of said x axis;
        means for detecting the end of travel of said handle at either end of said y axis; and
        means for inhibiting movement of said cursor in a direction opposite to its last movement along an axis when the end of travel of the handle is detected along that axis, until the handle is withdrawn from the end of travel position and once again moved toward the same end of travel position.

2. The cursor controller of claim 1 wherein the strip portion of said first encoder strip and detector means is mounted to said first cross-slide and the strip portion of said second encoder strip and detector means is mounted to said second cross-slide.

3. The cursor controller of claim 1 wherein the strip portions of said encoder strip and detector means each comprise a plurality of uniformly spaced transverse stripes with specially formatted end of travel indicia at the ends thereof.

4. The cursor controller of claim 3 wherein the detector portions of said first and second encoder strip and detector means each comprise:
    two opto-couplers offset from each other along the length of their respective encoder strip portions by a distance equal to one-fourth the space between adjacent uniformly spaced stripes
    such that the direction of handle motion can be determined by said magnitude and direction determining means using quadrature techniques.

5. The cursor controller of claim 4 wherein the strip portion of said first encoder strip and detector means is mounted to said first cross-slide and the strip portion of said second encoder strip and detector means is mounted to said second cross-slide.

6. The cursor controller of claim 5 wherein said stripes are formed from alternating, uniformly spaced slots and ribs in said first and second encoder strips.

7. The cursor controller of claim 6 wherein said opto-couplers each include an emitter mounted adjacent one side of the associated encoder strip and a detector mounted adjacent the other side of the same strip to detect radiation passing from the emitter through a slot in the strip.

8. A cursor controller for use in a computer comprising:
    actuator means for manual movement within a predefined limited area;
    fixed detector means for sensing the direction and magnitude of movement of said actuator means within said area;

means for interfacing said detector means to a computer to control the movement of a computer generated cursor in response to movement of said actuator means;

means for detecting the end of travel of said actuator means within said area; and means for restricting movement of said cursor when an end of travel condition is detected, until the actuator means is withdrawn from the end of travel position and once again moved toward the same end of travel position.

9. The cursor controller of claim 8 wherein said detector means senses the direction and magnitude of movement of said actuator means along x and y axes within said area, and said end of travel detecting means detects the end of travel of said actuator means at the ends of said x and y axes.

10. The cursor controller of claim 9 wherein said restricting means inhibits movement of said cursor in a direction opposite to its last movement along an axis when the end of travel of the actuator means is detected along that axis.

* * * * *